United States Patent [19]

Ray

[11] Patent Number: 4,493,061
[45] Date of Patent: Jan. 8, 1985

[54] STACKED MARINE SEISMIC SOURCE

[75] Inventor: Clifford H. Ray, Houston, Tex.

[73] Assignee: Fairfield Industries, Inc., Houston, Tex.

[21] Appl. No.: 380,569

[22] Filed: May 21, 1982

Related U.S. Application Data

[63] Continuation-in-part of Ser. No. 291,269, Aug. 10, 1981, Pat. No. 4,441,174.

[51] Int. Cl.³ .......................... G01V 1/36; G01V 1/38
[52] U.S. Cl. ........................................ 367/23; 367/24; 181/111; 181/112
[58] Field of Search ............... 181/114, 116, 118, 120, 181/110, 111; 367/145, 16, 23, 24, 48, 57

[56] References Cited

U.S. PATENT DOCUMENTS

| | | | |
|---|---|---|---|
| 2,953,214 | 9/1960 | Merten | 367/23 X |
| 3,195,676 | 7/1965 | Eisler et al. | 367/57 |
| 3,331,050 | 7/1967 | Kilmer et al. | 367/23 |
| 3,339,176 | 8/1967 | Sparks | 367/23 |
| 3,480,101 | 11/1969 | Barry et al. | 367/145 X |
| 4,254,480 | 3/1981 | French | 367/23 X |
| 4,353,121 | 10/1982 | Ray et al. | 367/21 |
| 4,441,174 | 4/1984 | Ray et al. | 367/23 |

OTHER PUBLICATIONS

Ray "High Resolution Using the Fair Flex", Nov. 2, 1978, Soc. Explor. Geophys Ann. Mtg., #48, p. 35, Ti and Stony.

Ray, "Exploration Targets Using the Fair Flex . . . ", Nov. 8, 1979, Soc. Explor. Geophys. Ann. Mtg., vol. 49, p. 38, Tiest.

Primary Examiner—Nelson Moskowitz
Assistant Examiner—Brian Steinberger
Attorney, Agent, or Firm—Vaden, Eickenroht, Thompson, Bednar & Jamison

[57] ABSTRACT

An arrangement of a plurality of individual gas expansible marine sources, wherein the positive portions of the primary shock waves are additive in effect, the negative portions of the primary shock waves are not additive in effect and the positive and negative portions of the after-shock or bubble occurrences also are not additive in effect.

7 Claims, 8 Drawing Figures

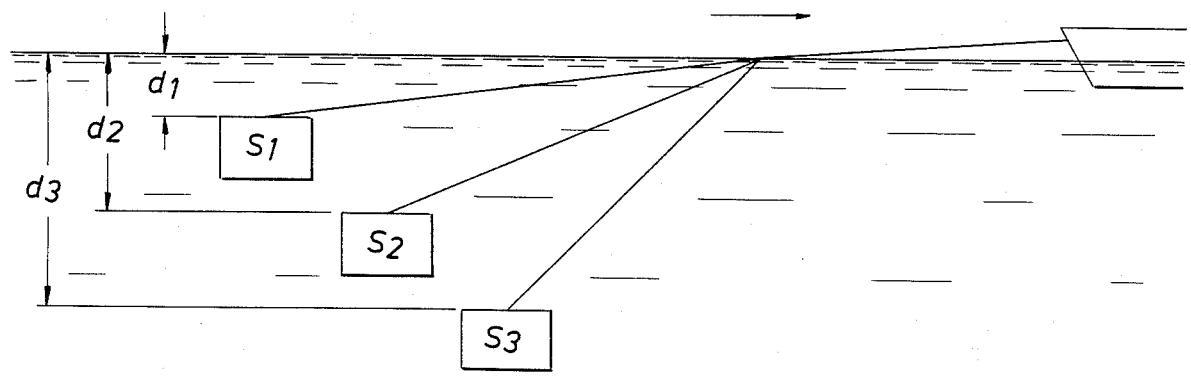
FIG. 5
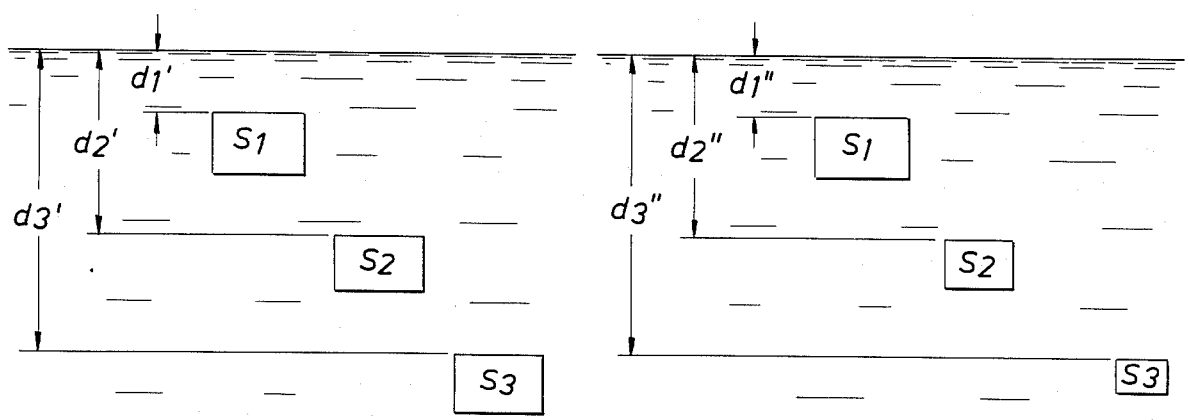
FIG. 7          FIG. 7
FIG. 8
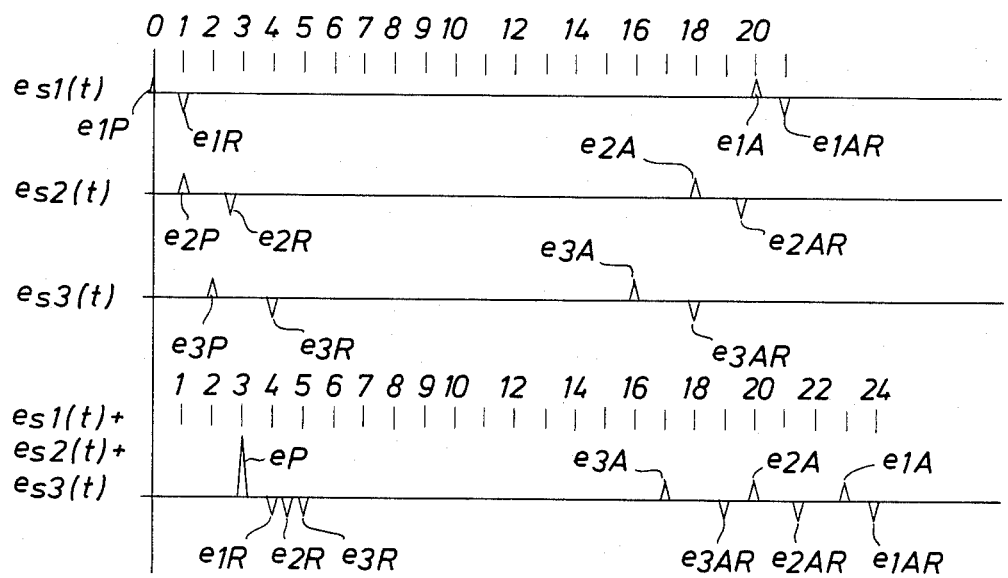

STACKED MARINE SEISMIC SOURCE

This application is a continuation-in-part of copending application Ser. No. 291,269, now U.S. Pat. No. 4,441,174 entitled "Stacked Marine Seismic Source", filed Aug. 10, 1981, Clifford H. Ray and Neil A. Moore.

BACKGROUND OF THE INVENTION

1. Field of the Invention

This invention pertains to marine seismic source and more particularly to an improved seismic source comprising a plurality of individual gas expansible sources.

2. Description of the Prior Art

Various seismic wave generators have been employed in the past, starting with controlled dynamite charges as a source of energy. One of the most promising of the various sources employed today use explosive gas mixtures which explode either in open-bottomed domes or into various enclosures.

One very successful gas exploder employing a closed enclosure is disclosed in U.S. Pat. No. 3,480,101 entitled "Seismic Wave Source Using Explosive Gas In An Expansible Enclosure", issued Nov. 25, 1969 in the name of Adelbert Berry, et al. The disclosure of this patent is incorporated by reference for all purposes.

A feature of the device disclosed in patent '101 and similar devices is that when the device is set off beneath the surface of the water, there is a primary energy shock imparted to the water and, after a period of time, there is an after-shock imparted to the water. The most popular explanation as to why and when this after-shock energy pulse occurs involves the effect of the hydrostatic pressure of water on the expansion enclosure of sleeve. That is, the sleeve expands the first time with gas explosion against the hydrostatic pressure of the water on the sleeve. This pressure causes the sleeve to contract or collapse; however, the gas in the chamber is sufficient, as there is pressure relief around the sleeve caused by the initial shock, to cause a second and lesser expansion to occur. Hence, there is an occurrence of a second shock.

Although the dynamics of gas expansion and external hydrostatic pressure and other related phenomena may not be completely understood or comprehended, the after-shock occurrence is undeniably present and very observable. Furthermore, it is also known that as the depth of the seismic source increases, the time between the primary shock and the after shock decreases, again probably because of the dynamic effect of the increased hydrostatic pressures at the greater depths.

A single primary source of the type described in U.S. Pat. No. 3,480,101 produces a pulse with a relatively uniform energy amplitude over a range of frequencies from about 40 Hz to 1200 Hz. it is known that the energy in the higher frequencies of this range are not particularly useful for exploration targets deeper than about 3,000 feet; therefore, it is desirable to expend proportionally more energy at lower frequencies than is available in known prior art sources.

A primary pulsing of energy from a seismic energy source of the type described above has both a positive portion and a negative portion immediately following as a result of reflection from the water source. The after-shock pulse of energy also includes both a positive and negative portion at a slightly later time, as mentioned above. The net effect of the two shocks of the type described occurring one after the other is that, in the frequency domain, one or more notches are established in the lower part of the frequency spectrum of interest. It is desirable to eliminate or greatly smooth the notching effect that results from operation of the source such as described above.

Sources which are activated on the surface of the water only have components of radiating energy outwardly and downwardly. A source that is activated somewhat below the surface of the water produces a wave in an upward direction, as well, which returns as a reflected or ghost pulse in a negative polarity with respect to the initial positive polarity. If there is no escaping energy at the surface at the time of reflection (i.e., no surface "blow-out"), then substantially the same amount of energy is reflected as initially produced. When there is "blow-out", then the amount of energy reflected is equal to one bar (i.e., one atmosphere of pressure). Having blow-out is desirable in a sense. A large shock produces a large positive portion, but a negative portion that does not exceed the predetermined value of one bar. Therefore, the result is a relatively large positive pulse and a relatively limited negative pulse, which is a desirable source shape.

However, it may be seen that a deeper source has to produce a greater shock to produce blow-out than a shallower source. This means that the positive and negative energy amplitude remain the same at a higher level for the deeper sources, resulting in notching and other undesirable characteristics at a higher energy level.

Preferred arrangement of individual gas exploders capable of operating in the manner just outlined are described and claimed in patent application Ser. No. 291,269, which is hereby incorporated by reference for all purposes.

Another type of a gas expansible source, i.e., a source which produces an expanding gas at the point of origin of the source, is referred to as a pneumatic sound source or air gun. A major manufacturer of such sources is Bolt Technology Corporation of Norwalk, Conn., although there are other manufacturers of such equipment. The air guns are available covering a range of air chamber volumes from about 1,000 to 2,000 cubic inches and operating pressures from 200 to 2,000 pounds per square inch and even greater.

The Bolt air guns are marketed under the trademark PAR and typically includes two high pressure chambers, an upper control chamber and a lower discharge chamber. In the stable or rest position, the two chambers are sealed by a triggering piston and a firing piston mounted on a common shank. forming a shuttle. High pressure air (e.g., 2,000 psi) supplied to the upper control chamber through an air hose from a shipboard compressor and "bleeds" into the lower firing chamber through an orifice in the shank of the shuttle. The gun is sealed because the area of the upper triggering piston is greater than that of the firing piston, and a net downward holding force exists. The gun is fired by actuating the solenoid with an electrical firing pulse. A "slug" of high pressure air is suddenly delivered to the bottom side of the triggering piston, thereby upsetting the force balance. The shuttle valve assembly opens at high velocity, reaches maximum stroke, and returns to its sealed position, all in a period of about ten milliseconds. During the few milliseconds the valve is open, most of the high pressure air in the discharge chamber is suddenly vented to the water through ports in the cylindrical wall. In larger air guns, four air jets from four individual ports merge to form a roughly spherical oscillating air bubble.

Gas expansible sources of both the gas exploder type and the air gun type are capable of being stacked in such a way that the positive portions of the primary acoustical waves accumulate while the negative portions do not. Moreover, the positive and negative portions of the after-shock waves (or so-called "bubbles", which is the common terminology for the after-shock waves from an air gun source) do not accumulate.

Air guns in the prior art have either been deployed singly or in a group at the same depth. However, it has been discovered by applicant that the vertical and horizontal spacing and variation in volumes of air guns produce desirable overall source signatures wherein the desirable characteristics described above are optimized.

Therefore, it is a feature of the present invention to provide an improved seismic marine source of the gas expansion type to enchance the positive portion of the primary shock energy therefrom while not enhancing the negative portions or the positive and negative portions of the after-shock energy by vertical and horizontal positioning of the individual sources.

It is another feature of the present invention to provide an improved seismic marine source of the gas expansion type to enchance the positive portion of the primary shock energy therefrom while not enhancing the negative portion and the after-shock energy by vertical and horizontal positioning and by volume selection of the individual sources.

SUMMARY OF THE INVENTION

In accordance with the present invention, two or preferably three of four sources of the type of gas expansion seismic energy such as described in the '101 patent or of the air gun type are vertically positioned one above the other, all of which are located below the surface of the water and are horizontally positioned with the deepest being towed ahead of the next deepest and so forth. Typically, when three sources are stacked, the most shallow is placed at a distance of two feet beneath the water surface, and the deepest of the three sources is located at a distance of five feet below the surface. All are wired for substantially simultaneous triggering.

If the three sources were vertically positioned without any horizontal off-set, following triggering or activation of the sources at a point below all of the individual sources, the positive portions from the deepest source arrives, then the intermediate source and finally the shallowest source. The next-to-arrive pulse is the negative (or, "ghost") pulse from the shallowest source, then the intermediate source and then the deepest source. The resulting energy envelope of the pulses is a spread positive wave followed by a spread negative wave. The three positive pulses enhancing each other followed by the three negative pulses enhancing each other.

The arrival of the individual after-shock pulses produces a different result. The first to occur below the area where the sources are located is the positive pulse from the deepest source, then the negative pulse therefrom, then the positive pulse from the intermediate source, then the negative pulse therefrom, then the positive pulse from the most shallow of the sources and, finally, the negative pulse from the shallowest source. Hence, the positive pulses and negative pulses are interspersed and there is no pulse enhancement with respect to the after-shock pulses as there is with respect to the primary shock pulses. What has just been described is a preferred arrangement for placing the individual sources as described in patent application Ser. No. 291,269.

However, the invention claimed herein pertains to a different placement and pertains also to source volume selection. By horizontal positioning so that the deepest of the individual sources is towed ahead of the next deepest source and this individual source is ahead of the next deepest, and so forth, then it is possible to align the positive portion of the primary wave while misaligning the other three pulses or portions. Furthermore, since the after-shock wave becomes closer to the primary wave with depth and with volume size, then by the proper adjustment of the individual sources with respect to each other, it is possible to assure the desired enhancement and at the same time assure virtually no enhancement and even cancellation of the other portion of the primary waves and both the positive and negative portions of the after-shock wave.

The negative portions of both the primary wave and the after-shock wave occur as a result of the "ghost" effect of surface reflection. Software data processing techniques are capable of distinguishing such negative-polarity signals from positive-polarity signals. But, the spacing and volume selection is important in separating the individual returns and thereby optimizing the positive primary returns while minimizing practically all of the accumulation effect of after-shock returns.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this application. It is to be noted, however, that the appended drawings illustrate only a preferred embodiment of the invention and are therefore not to be considered limiting of its scope, for the invention may admit to other equally effective embodiments.

In the Drawings:

FIG. 5 is a schematic representation of a marine source in accordance with a preferred embodiment of the present invention which includes three stacked sources, the deepest being towed ahead of the next deepest and the middle deepest being towed ahead of the most shallow.

FIG. 6 is a schematic representation of a marine source similar to that shown in FIG. 5, but with the vertical spacing of the individual sources being greater than for FIG. 5.

FIG. 7 is a schematic representation of a marine source similar to that shown in FIG. 5, but with the vertical spacing and the chamber volume sizes for the individual sources being greater than for FIG. 5.

FIG. 8 is a combined time domain wave diagram of the primary and after-shock energy waves from three stacked sources in accordance with FIG. 5 of the present invention.

DESCRIPTION OF THE PREFERRED EMBODIMENTS

In performing a marine seismic survey, it is normal for a marine seismic vessel to track along a predetermined course on the surface of a body of water, normally the sea. An energy source is towed by the vessel for imparting pulses downwardly into the water. Although it is possible to tow the source on the surface, it is normally towed beneath the surface where the water is more stable than the surface.

Figure 1:
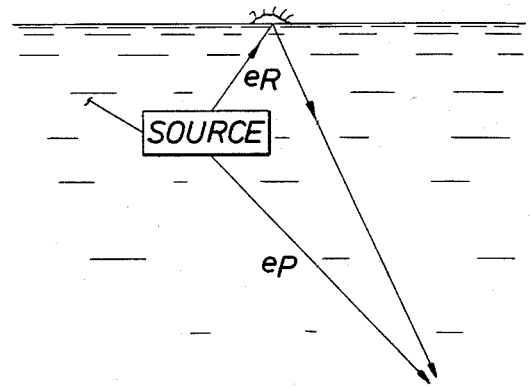
FIG. 1 is a schematic representation of the marine seismic source being detonated in accordance with the present invention.

A preferred energy source has heretofore been the Fairflex TM minisleeve exploder system of Fairfield Industries, Inc., which system's essential elements are described in U.S. Pat. No. 3,480,101, with patent disclosure is incorporated herein by reference for all purposes. Sometimes this type of source is referred to as a gas expansion source. This terminology herein, however, also refers to an air gun source as hereinafter discussed. Such a source provides an energy pulse length of less than one-millisecond positive pressure and produces a nearly perfect acoustic wavelet having a finite period of less than three-milliseconds and a broad frequency spectrum with a maximum frequency at about 200-250 Hz, gently rolling above and below the maximum for about three octaves. The wavelet is the result of a positive energy portion progressing downwardly into the water for bottom surface and sub-bottom surface reflection, such as shown as $e_P$ in FIG. 1, and a negative or ghost energy portion progressing downwardly into the water following reflection at the water/air interface. This portion of the expended source energy is shown as $e_R$ in FIG. 1.

Also towed by the vessel is a cable or streamer along which are located a plurality of hydrophone arrays or detectors for receiving the seismic reflections. It is desirable that the source be large, undistorted, at a low frequency and free of interferring energy impulses.

As discussed above, a single source of the type described produces energy detectable at a point below the source comprising a primary positive energy portion, a primary negative or ghost energy portion, an aftershock positive energy portion and an after-shock negative or ghost energy portion. The combination of individual sources each producing portions of the kind described, results in an enhancement/non-enhancement combination that is far superior to any individual source.

Figure 2:
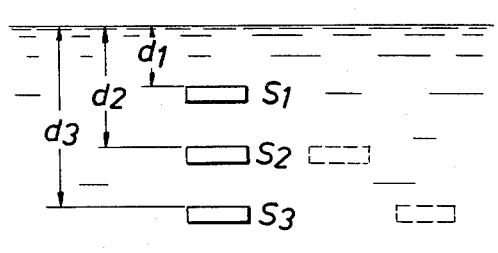
FIG. 2 is a schematic representation of a marine seismic source in accordance with a preferred embodiment of the present invention which includes three stacked sources.

In this arrangement, as shown in FIG. 2, source S1 is located at a distance $d_1$ below the surface of the water; source S2 is located therebeneath at a distance $d_2$ below the water surface; source S3 is located at a deeper level yet below source S1 at a distance $d_3$ below the water surface. In one preferred embodiment, $d_1$ is equal to 2 feet; $d_2$ is equal to 3½ feet; and $d_3$ is equal to 5 feet. The velocity of sound traveling in water is approximately 5,000 feet per second. Hence, the time for sound to travel from source S1, to the surface to be reflected therefrom and return to source S1 is approximately 0.8 milliseconds based on the formula 2 $d_1$/5,000. Similarly, the round-trip time for an energy pulse from source S2 to return thereto is 1.4 milliseconds and the round-trip time for an energy pulse from source S3 to return thereto is 2.0 milliseconds.

Figure 3:
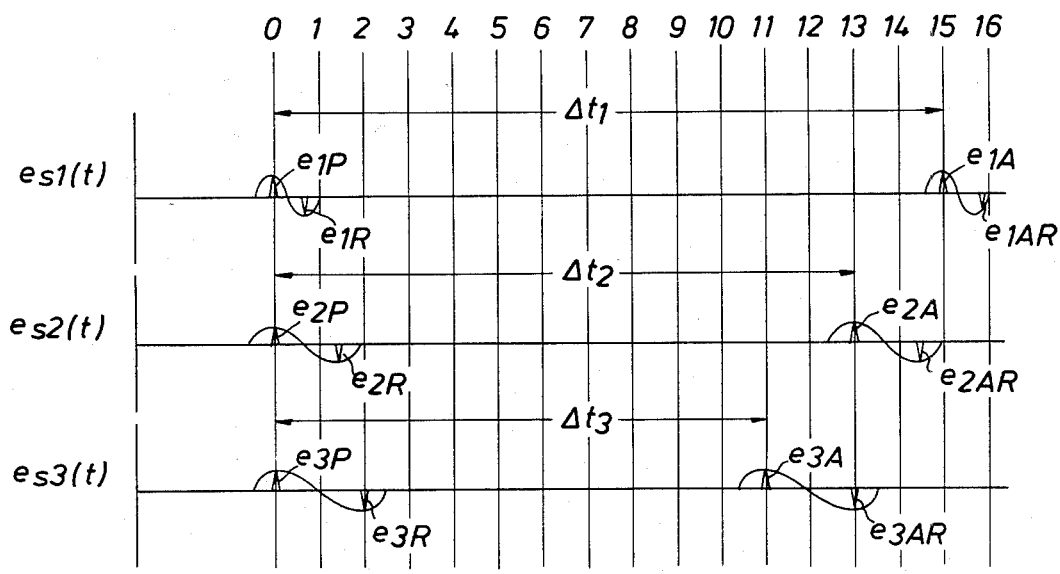
FIG. 3 are time domain diagrams of the primary and after-shock energy waves from three stacked sources in accordance with the present invention.

Diagrammatically, the positive and negative portions for the primary pulses from each of sources S1, S2 and S3 are shown in FIG. 3. The pulse portions for source S1 are shown on the top line as $e_{1P}$ and $e_{1R}$; the pulse portions for source S2 are shown on the middle line as $e_{2P}$ and $e_{1R}$; and the pulse portions for source S3 are shown on the bottom line as $e_{3P}$ and $e_{3R}$, respectively. If it is assumed that the positive pulses all originate substantially simultaneously, then the respective occurrences for the three sources are accurately reflected in the drawing.

It has been measured that the positive portion of the after-shock wave occurs at a $\Delta t1$ after the positive portion of the primary wave of about 15 milliseconds for a source S1 located at a depth of 2 feet; that the positive portion of the after-shock wave occurs at a $\Delta t2$ after the positive portion of the primary wave of about 13 milliseconds for a source S2 located at a depth of 3½ feet; and that the positive portion of the after-shock wave occurs at a $\Delta t3$ after the positive portion of the primary wave of about 11 milliseconds for a source S3 located at a depth of 5 feet. The negative portion of each of these after-shock waves follow their respective positive portions by the same amount of time the negative portions follow their respective positive portions for the primary wave.

The after-shock portions for the waves emanating from source S1 and labelled $e_{1A}$ and $e_{1AR}$ in FIG. 3; the after-shock portions for the waves emanating from source S2 are labelled $e_{2A}$ and $e_{2AR}$; and the after-shock energy wave portions for the waves emanating from source S3 are labelled $e_{3A}$ and $e_{3AR}$.

Figure 4:
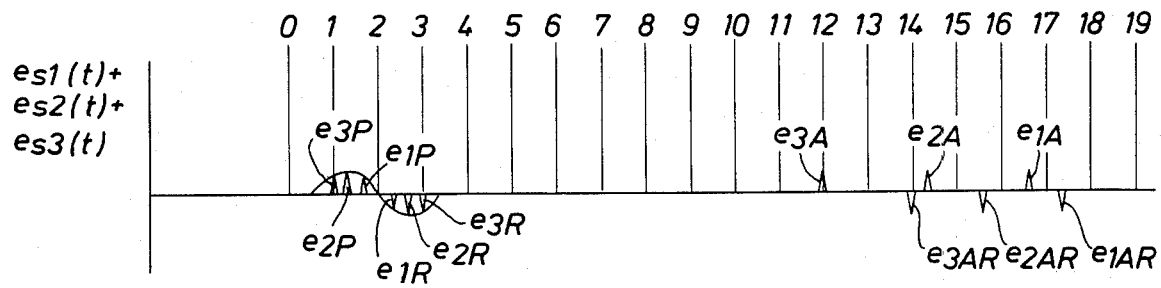
FIG. 4 is a combined time domain diagram of the primary and after-shock energy waves from three stacked sources in accordance with FIG. 1 of the present invention.

It may now be observed what the culmulative effect is of all three sources S1, S2 and S3 at a location below the three "stacked" sources by observing the diagram set forth in FIG. 4. Arbitrarily a location of 5 feet is selected below source S3 where the wave portions from source S3 arrive just 1 millisecond later than at source S3. As will be seen, the first to arrive wave is $e_{3P}$, then 0.3 milliseconds later $e_{2P}$ and then 0.3 milliseconds later $e_{1P}$. These combine to make a large extended positive pulse envelope in the frequency range between 25-250 Hz. The next to arrive portion is the $e_{1R}$ at a time 0.8 milliseconds after $e_{1P}$, then $e_{2R}$ at a time 0.3 milliseconds later and then $e_{3R}$ at a time 0.3 milliseconds later. Again, the negative portions combine to make a large single extended pulse in the frequency range between 25-250 Hz.

The next-to-arrive pulse is $e_{3A}$, then at a time of 2 milliseconds later, $e_{3AR}$. Then, at a time of 0.3 milliseconds after $e_{3AR}$, $e_{2A}$ arrives followed by $e_{2AR}$ at a time of 1.4 milliseconds later. At a time of 0.9 milliseconds later, $e_{1AR}$ arrives. It should be noted that the positive portions are interspersed with the negative portions for the after-shock wave and, therefore, there is no enhancement of such waves as with the primary waves.

The blow-out effect on the ghost or negative portions should now be considered. A shock wave imparted somewhat below the surface of the water may or may not cause surface blow out depending on the amplitude of shock. If the magnitude of the shock is less than enough to cause blow out, then the amplitude of the reflected or ghost wave at the surface will be very nearly the same amplitude as the direct or positive wave from the source. On the other hand, if the magnitude of the shock is more than enough to cause blow out, the negative or reflected wave will be limited to one bar of pressure whereas the positive shock will be more than that. If the difference is relatively great, then the ghost or negative portion is small with respect to the positive portion, which is generally thought of as an advantage for a seismic shock wave produced by a source.

A single source at a shallow depth may cause blow out whereas the same source at a greater depth will not, allowing the negative or ghost reflection to be substantially the same amplitude as the positive wave.

However, the stacked arrangement which has been just described produces a cumulative effect on the blow out phenomenon. The upward wave from the top source arrives just a fraction of a millisecond ahead of a simultaneously detonated source one and one-half feet below the first source. And, the upward waves from the top and intermediate sources arrive just a fraction of a millisecond ahead of a simultaneously detonated third source just one and one-half feet below the second source. The cumulative effect is that effectively blow out occurs for all three upward waves whereas the force from even the top source acting alone may not have been sufficient for blow out. The downward direct or positive wave also is enhanced by the cumulative gathering shock wave so that there is relatively strong enhancement of the stacked source detonations for the positive wave with respect to the negative wave. The negative wave tends to flatten a bit, but otherwise, there is no amplitude enhancement. And, in fact, the negative portion amplitude for the deepest source is less than it would have been for detonation of that source alone.

The stacked arrangement also has a salutary effect on the notching caused in the frequency spectrum by the energy wave from a single source. Because of the hydrostatic pressure of the water, the deeper the source, the shorter the period of the energy pulse. Since the frequency spectrum is therefore different for each of three successively deeper sources, the notches that occur for each of the three are slightly displaced from each other, the cumulative effect being a disappearance of notches for the overall energy pulse.

The above discussion has been with respect to vertically stacked sources simultaneously exploded. Please note that by not vertically stacking, such as shown by dotted sections in FIG. 2, and by detonating not at the same instant of time, it is possible to minimize the mechanical interference effect of one source being above another and also somewhat to establish directivity to the advancing wave front. The principal operating mode that permits enhancement of the primary positive wave while not enhancing the after shock waves is still accomplished.

Now referring to FIG. 5, a schematic representation of a plurality of individual sources being towed behind a vessel is shown wherein the deepest source S1 is towed ahead of the next deepest source S2 and the shallowest source S3 is towed horizontally behind the source S2. The sources may be the gas exploder type of gas expansible source; however, they are preferably of the air gun or pneumatic sound source type. In the preferred use, the positive portions of the acoustical sound resulting from triggering of the individual sources accumulate as the waves travel downward so that at a location below the deepest of the sources, the accumulated positive portions are as they appear in FIG. 8 at $e_P$. The return or negative ("ghost") portions of the individual sources do not accumulate, but are spaced out at $e_{1R}$, $e_{2R}$ and $e_{3R}$.

The after-shock ("bubble" in air-gun terminology) portions also do not accumulate either in their positive portions or in their negative portions as shown for $e_{3A}$, $e_{2A}$, $e_{1A}$, $e_{3AR}$, $e_{2AR}$ and $e_{1AR}$. However, the exact relative locations may not be as desired. The relative locations can be changed, by varying the relative placement and/or the relative sizes of the individual sources, as shown in FIGS. 6 and 7 compared with the individual sources shown in FIG. 5. Note that in FIG. 5, each individual source S1, S2 and S3 are located at respective distances $d_1$, $d_2$ and $d_3$ from the surface of the water. Typically, these distances may be respectively 15 feet, 20 feet and 25 feet. Please note that the stacking of the primary signals $e_{1P}$, $e_{2P}$ and $e_{3P}$, as shown in FIG. 8, spaces out $e_{1R}$, $e_{2R}$ and $e_{3R}$ and also both the positive and negative portions of the after-shock signals, also as shown in FIG. 8. However, by spacing the individual sources as shown in FIG. 6 so that S1, S2 and S3 are respectively at $d_1$, $d_2$ and $d_3$ (e.g., 5, 15 and 30 feet) the relative position of the individual portions are modified. The relatively deeper sources have a relatively shorter period between primary and after-shock waves. Also, by changing the relative volume of the sources as shown in FIG. 7 and by modifying the distances, the spread between the pulses are further modified, the volume size also affecting the frequency of the source. Importantly, however, for the present invention, the smaller the source chamber, the shorter is the period between the primary and the after-shock waves.

While a particular embodiment of the invention has been shown and described, it will be understood that the invention is not limited thereto, since many modifications may be made and will become apparent to those skilled in the art. For example, more than three stacked individual sources can be employed and there is even benefit from the stacking of only two sources.

I claim:

1. A marine seismic wave source, including a plurality of individual gas expansible sources, each of said sources producing a primary shock wave into the water from the location where said source is positioned, each of said sources also producing an after-shock wave into the water a predetermined time after said primary shock wave, comprising;

a first of said individual sources towed at a first depth below the surface of the water, the negative portion of said primary wave from said first source being separated from the positive portion thereof dependent on the round-trip acoustical travel time of the source impulse to the water surface, the positive portion of the after shock wave therefrom occurring at a time after the primary shock wave dependent on the pressure of the water at said first depth, the negative portion of said after shock wave being separated from its positive portion by the same time separation that the negative portion of the primary wave is separated from its positive portion, a second of said individual sources towed ahead of said first individual source at a second depth below the surface of the water greater than said first depth, the negative portion of said primary wave from said second source being separated from the positive portion thereof dependent on the round-trip acoustical travel time of the source impulse to the water surface, the positive portion of the after-shock wave therefrom occurring at a time after the primary shock wave dependent on the pressure of the water at said second depth, the negative portion of said after-shock wave being separated from its positive portion by the same time separation that the negative portion of the primary wave is separated from its positive portion, the round-trip time for said second source being longer than the round-trip time for said first source, the pressure for said second source being greater than the pressure for said first source, thereby causing the relative time of arrival of said after shock for said second source to be shorter than for said first source, said positive portions of the primary waves from said first and second sources occurring substantially simultaneously at a location below said second source before the negative portion of the primary wave from said first source occurs at said location, which is then followed by the negative portion of the primary wave from said second source at said location, said primary and negative portions of said first source and second source after-shock waves occurring at respectively different times at said location, whereby, said positive portions of said primary shock wave energy accumulates and said negative portions of said primary shock wave energy and said positive and negative portions of said after-shock wave energy do not accumulate.

2. A marine seismic source in accordance with claim 1, wherein the volume of said second source is less than the volume of said first source.

3. A marine seismic source in accordance with claim 1, and including;

a third individual source towed ahead of said second individual source at a third depth below the surface of the water greater than said second depth, the negative portion of said primary wave from said third source being separated from the positive portion thereof dependent on the round-trip acoustical travel time of the source impulse to the water surface, the positive portion of the after-shock wave dependent on the pressure of the water at said third depth, the negative portion of said after-shock being separated from its positive portion by the same time separation that the negative portion of the primary wave is separated from its positive portion, the round-trip time for said third source being longer than the round-trip time for said second source, the pressure for said third source being greater than the pressure for said second source, thereby causing the relative time of arrival of said after-shock for said third source to be shorter than for said second source, said positive portions of the primary waves from said first, second and third sources occurring substantially simultaneously at a location below said third source before the negative portion of the primary wave from said first source occurs at said location, which is then followed seriatim at said location by the negative portion of the primary wave from said second source, the negative portion of the primary wave from said third source, said primary and negative portions of said first source, second source and third source after shock waves occurring at respectively different times at said location, whereby said positive portions of said primary shock wave energy accumulates and said negative portions of said primary shock wave energy and said positive and negative portions of said after-shock wave energy do not accumulate.

4. A marine seismic source in accordance with claim 3, wherein the volume of said third source is less than the volume of said second source.

5. A method of establishing a marine seismic source wave, which comprises;

detonating a first gas expansible source at a first depth below the surface of the water, the negative portion of the primary wave therefrom being separated from the positive portion dependent on the round-trip acoustical travel time of the source impulse to the water surface, the positive portion of the after-shock wave therefrom occurring at a time after the primary shock wave dependent on the pressure of the water at said first depth, the negative portion of said after-shock wave being separated from its positive portion of the primary wave is separated from its positive portion, detonating a second gas expansible source at a second depth below the surface of the water forward and greater than said first depth, the negative portion of the primary wave from said second source being separated from the positive portion thereof dependent on the round-trip acoustical travel time of the source impulse to the water surface, the positive portion of the after-shock wave therefrom occurring at a time after the primary shock wave dependent on the pressure of the water at said second depth, the negative portion of said shock wave being separated from its positive portion by the same time separation that the negative portion of the primary wave is separated from its positive portion, the round-trip time for said second source being longer than the round-trip time for said first source, the pressure for said second source being greater than the pressure for said first source thereby causing the relative time of arrival of said after-shock for said second source to be shorter than for said first source, said positive portions of the primary waves from said first and second sources occurring substantially simultaneously at a location below said second source before the negative portion of the primary wave from said first source occurs at said location, which is then followed by the negative portion of the primary wave from said second source at said location, said primary and negative portions of said first source and second source after shock waves occurring at respectively different times at said location, whereby, said positive portions of said primary shock wave energy accumulates and said negative portions of said primary shock wave energy and said positive and negative portions of said after-shock wave energy do not accumulate.

6. A method in accordance with claim 5, wherein the relative positive of said negative portions of said primary waves from said first and second sources and of said primary wave from said after-shock waves are adjustable by changing the depth locations of said first and second individual sources, a greater depth further separating the negative and positive portions of a wave and shortening the separation of the after-shock from the primary shock.

7. A method in accordance with claim 5, wherein the relative positions of said after-shock waves from their corresponding primary waves are adjustable by changing the volumes of said individual sources, the smaller the volume of an individual source the shorter the separation of the after-shock from the primary shock.

* * * * *